United States Patent [19]

Koide

[11] Patent Number: 4,620,301
[45] Date of Patent: Oct. 28, 1986

[54] RECORDING DISK DRIVE UNIT

[75] Inventor: Hiroshi Koide, Kanagawa, Japan

[73] Assignee: Ricoh Company, Ltd., Japan

[21] Appl. No.: 562,717

[22] Filed: Dec. 19, 1983

[30] Foreign Application Priority Data

Dec. 20, 1982 [JP] Japan ................... 57-223306
Jan. 13, 1983 [JP] Japan ................... 58-3942

[51] Int. Cl.$^4$ .................. H02K 29/00; G11B 17/00; G11B 5/82
[52] U.S. Cl. .................. 369/266; 210/112; 210/268; 318/115; 360/86; 360/97; 360/105; 369/219; 369/249
[58] Field of Search ............... 369/264, 265, 266, 267, 369/219, 221, 249; 360/86, 97, 105; 210/112, 268; 318/115

[56] References Cited

U.S. PATENT DOCUMENTS

| | | | |
|---|---|---|---|
| 3,947,886 | 3/1976 | Hiedecker et al. | 360/86 |
| 3,972,535 | 8/1976 | Bleiman | 369/266 |
| 4,072,315 | 2/1978 | Tsujihara et al. | 369/266 |
| 4,131,828 | 12/1978 | Houshi | 369/266 |
| 4,143,409 | 3/1979 | Iwabuchi et al. | 360/86 |
| 4,377,761 | 3/1983 | Staciokas | 360/86 |
| 4,481,613 | 11/1984 | Yokota | 369/219 |

Primary Examiner—Steven L. Stephan
Attorney, Agent, or Firm—Guy W. Shoup

[57] ABSTRACT

A turntable for placing a recording disk such as an optical information storage disk has a rotatable shaft to which an electrically conductive rotor is fixed. Inner and outer stators are disposed in confronting relation to each other with the rotor interposed therebetween. Each stator has a C shape with a recess in which there is placed one end of a radial feed unit for moving a pickup head radially across the turntable for recording information on or retrieving information from the disk on the turntable while the latter is being rotated. The outer stator comprises a comb-shaped block having a plurality of teeth with coils wound thereon in different phases. When sinusoidal currents are supplied to the coils, the stator produces a moving sinusoidal magnetic field to rotate the rotor according to the principles of a polyphase induction motor. The rotor may double as the turntable.

8 Claims, 11 Drawing Figures

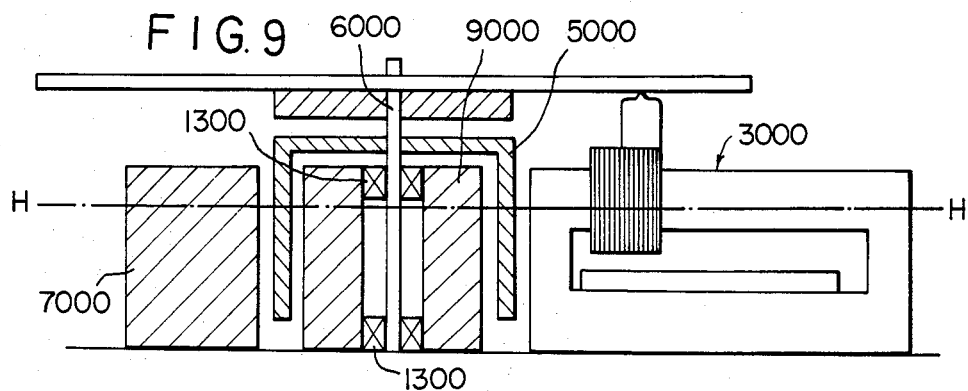
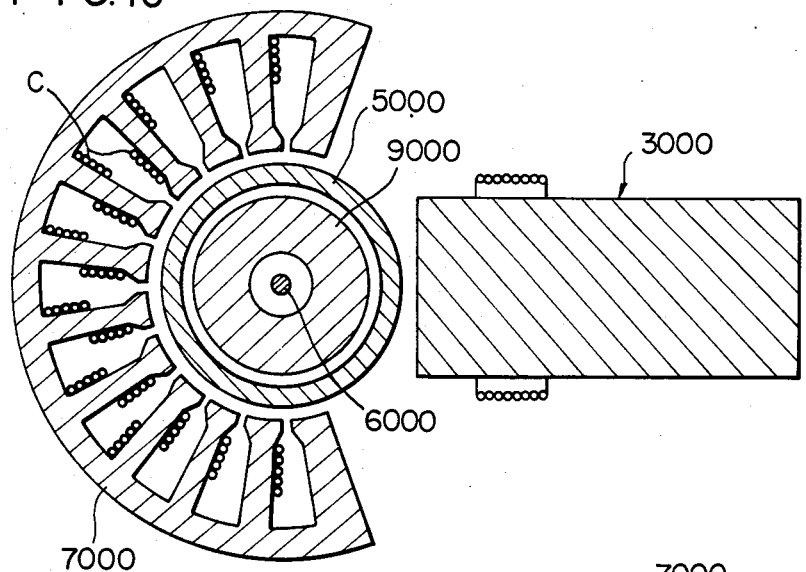
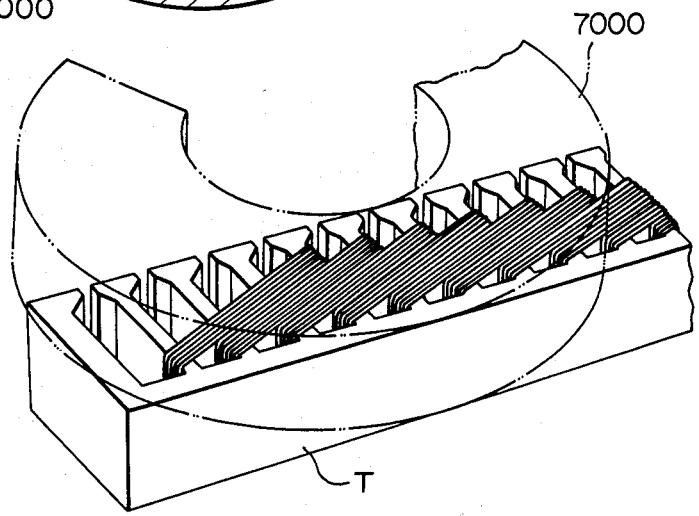

RECORDING DISK DRIVE UNIT

BACKGROUND OF THE INVENTION

The present invention relates to a drive unit for driving a recording disk such as an optical information storage disk.

Recording disk drive units include a turntable for placing a recording disk thereon, a motor for driving the turntable, and a radial feed unit for moving a pickup head radially across the recording disk. Information can be recorded on or retrieved from the recording disk through the pickup head by moving the latter radially across the recording head while rotating the recording disk. The conventional motor is of a cylindrical shape and disposed directly below the turntable. Where the radial feed unit comprises a linear motor, the yoke and permanent magnet of the unit have to be located outside of the motor. As a result, the yoke and permanent magnet of the linear motor should extend radially outwardly of the recording disk in order to enable the pickup head to move in a stroke necessary for recording and retrieving any desired information.

Therefore, the recording disk drive unit cannot be reduced to a size substantially equal to that of recording disks unless the portion of the drive unit which is positioned radially beyond the disk is eliminated.

The prior cylindrical motor is unitized as an independent construction, and hence the recording disk drive unit cannot be reduced in thickness since it is necessary to increase the height of the motor, if the outer motor profile should not be increased in the radial direction, in order to achieve a torque necessary for a higher rotating speed.

SUMMARY OF THE INVENTION

It is an object of the present invention to provide a recording disk drive unit which is small in size and low in profile.

To achieve the above object, the stator of a motor has a C shape with a recess in which there is positioned one end of a radial feed unit that has presented an obstacle to prior attempts to reduce the size of a recording disk drive unit. The radial feed unit is positioned within the radial dimension of a recording disk, so that the recording disk drive unit is reduced in size. The recording disk drive unit can be low in profile since the magnetic circuit can be increased in size in the radial direction for a higher torque. The motor has a rotor serving also as a turntable for placing a recording disk thereon. This arrangement also allows the recording disk drive unit to be low in profile.

The above and other objects, features and advantages of the present invention will become more apparent from the following description when taken in conjunction with the accompanying drawings in whch preferred embodiments of the present invention are shown by way of illustrative example.

BRIEF DESCRIPTION OF THE DRAWINGS

FIG. 9 is a fragmentary cross-sectional view of an optical recording disk drive unit according to a still futher object of the present invention;

FIG. 10 is a cross-sectional view taken along line H—H of FIG. 9; and

FIG. 11 is a perspective view of a first stator in the recording disk drive unit shown in FIG. 9.

DESCRIPTION OF THE PREFERRED EMBODIMENTS

Figure 1:
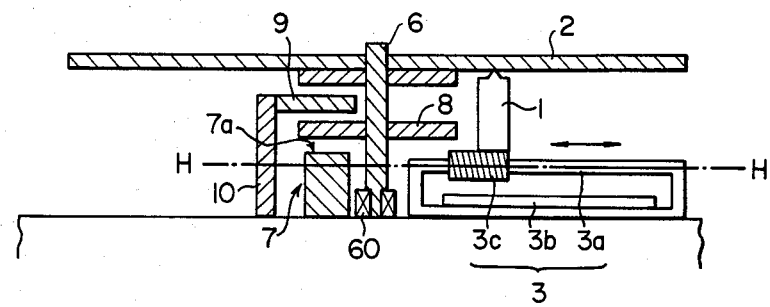
FIG. 1 is a cross-sectional view of a recording disk drive unit according to the present invention.

FIG. 1 illustrates, in cross section, a recording disk drive unit according to the present invention for driving a recording disk such as an optical information storage disk (hereinafter referred to as a "disk"). The recording disk drive unit includes a radial feed unit 3 for radially moving a pickup head 1 for recording information on or retrieving information from the disk, or a recording/playback head such as a magnetic head, the pickup head or the recording/playback head being hereinafter referred to as a "head". The radial feed unit 3 is composed of a yoke $3a$, a permanent magnet $3b$, and a coil $3c$. The radial feed unit 3 has one end located more closely to a central shaft 6 for rotating the disk 2 than conventional radial feed units. The radial feed unit 3 is located in its entirety within a radial space or dimension of the disk 2, and yet is capable of moving the head 1 in a radial stroke necessary for desired information recording or retrieval.

Figure 2:
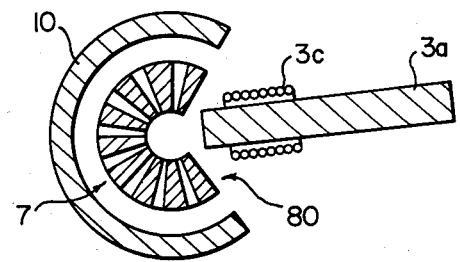
FIG. 2 is a cross-sectional view taken along line H—H of FIG. 1.

The construction allowing the radial feed unit 3 to be positioned closely to the shaft 6 is illustrated in detail in FIG. 2. A drive motor for rotating the shaft 6 has a first stator 7 of a C shape with a sectorial recess 80 in which there is disposed the end of the radial feed unit 3. The drive motor also has a rotor 8 coacting with the first stator 7 and comprising an electrically conductive circular plate such as a copper plate attached to the shaft 6 in coaxial relation thereto. The rotor 8 is positioned above and axially spaced from the first stator 7 with a gap left therebetween. A second stator 9 is disposed above and axially spaced from the rotor 8 with a gap therebetween, the second stator 9 being supported on an arcuate magnetic support member 10. The second stator 9 is positioned upwardly of the first stator 7 and has a surface coextensive in size and shape therewith.

Figure 3:
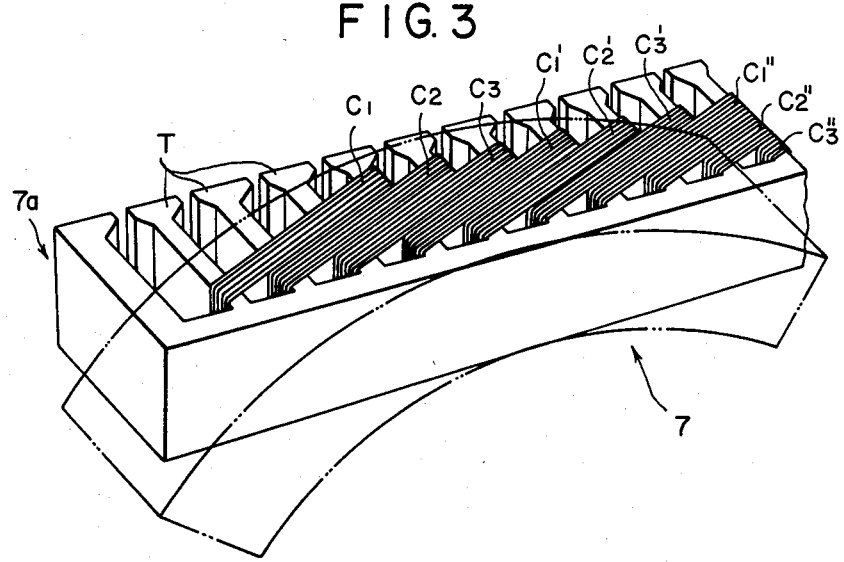
FIG. 3 is a fragmentary perspective view of a stator which is shown as a straight development.

The first stator 7 is shown in FIG. 3 as a straight development, the original first stator 7 being indicated by the imaginary lines. The first stator 7 comprises an elongate comb-shaped block having a plurality of teeth T with coils wound thereon in different phases. The first stator 7 has a surface $7a$ defined by distal ends of the teeth T and disposed in confronting relation to the rotor 8 with a gap therebetween.

Figure 4:
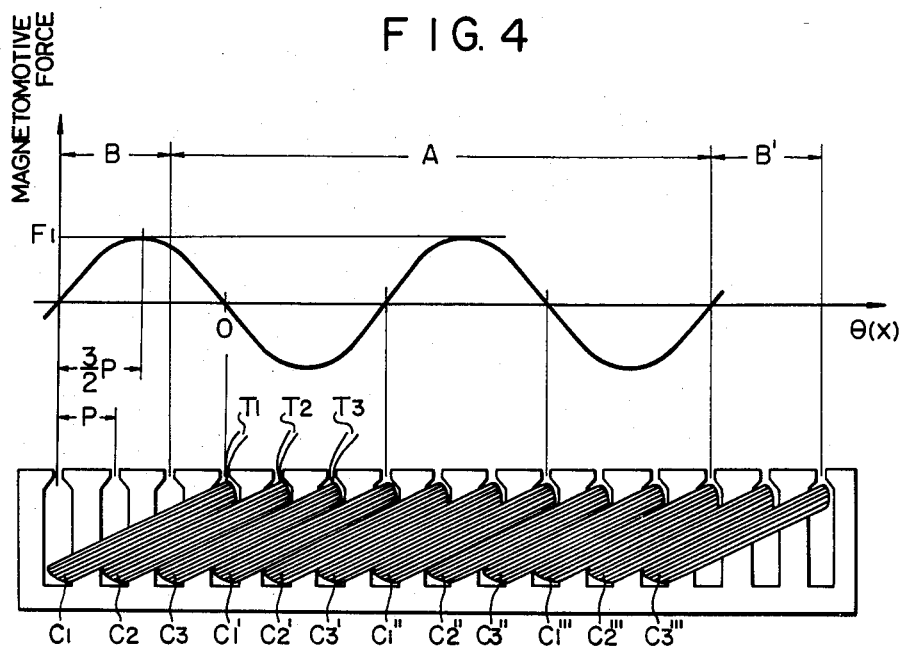
FIG. 4 is a diagram showing the stator of FIG. 3 and a magnetomotive force produced by any one coil in the stator.

As illustrated in FIG. 4, the coils include a coil $C_1$ wound around the first through third teeth (as counted from the left), a coil $C_2$ wound around the second through fourth teeth, a coil $C_3$ wound around the third through fifth teeth, and similar coils $C_1'$, $C_2'$, $C_3'$, $C_1''$, $C_2''$, $C_3''$, $C_1'''$, $C_2'''$, $C_3'''$ wound around the groups of every three successive teeth, the teeth groups being shifted in phase one tooth from the adjacent groups. The sets of coils $C_1$, $C_1''$ and coils $C_1'$, $C_1'''$ are wound in mutually opposite directions, the sets of coils $C_2$, $C_2''$ and coils $C_2'$, $C_2'''$ are wound in mutually opposite directions, and the sets of coils $C_3$, $C_3''$ and coils $C_3'$, $C_3'''$ are wound in mutually opposite directions. The coils $C_1$, $C_1'$, $C_1''$, $C_1'''$ are connected to a common terminal $T_1$, the coils $C_2$, $C_2'$, $C_2''$, $C_2'''$ are connected to a common terminal $T_2$, and the coils $C_3$, $C_3'$, $C_3''$, $C_3'''$ are connected to a common terminal $T_3$.

When three-phase sinusoidal currents that are 60° or 120° out of phase are supplied to the terminals $T_1$, $T_2$, $T_3$, the first stator 7 produces a moving sinusoidal magnetic field composed of lines of magnetic force passing through the teeth of the first stator 7, the rotor 8, the second stator 9, and other components. The rotor 8 is now rotated by the moving magnetic field on the principles of a polyphase induction motor. More specifically, the rotor 8 generates an eddy current where the lines of magnetic force pass therethrough according to the right-hand rule. The eddy current and the lines of magnetic force coact with each other to produce electromagnetic forces which rotate the rotor 8 in a direction determined by the left-hand rule.

The speed of rotation of the rotor 8 will now be discussed. It is assumed that three-phase sinusoidal currents $I_1$, $I_2$, $I_3$ that are 60° out of phase are supplied to the terminals $T_1$, $T_2$, $T_3$, and the motor operation is analyzed at any fixed point of time. Any one coil connected to the terminal $T_1$ now generates a magnetomotive force in the waveform of FIG. 4, which only shows a fundamental.

Let the magnetomotive forces produced by the currents $I_1$, $I_2$, $I_3$ be indicated by $F_1$, $F_2$, $F_3$, respectively, and these magnetomotive forces can be expressed by the following equations (1), (2), and (3):

$$F_1 = -K I_1 \sin \theta \qquad (1)$$

$$F_2 = -K I_2 \sin(\theta - (\pi/3)) \qquad (2)$$

$$F_3 = -K I_3 \sin(\theta - \tfrac{2}{3}\pi) \qquad (3)$$

where K is a constant, $\theta = (\pi/3P) x$, P being the pitch of the stator teeth and x the distance from the point O. Assuming that the currents $I_1$, $I_2$, $I_3$ have a maximum value $I_0$, they can be expressed by the following equations (4), (5), (6):

$$I_1 = I_0 \cos \omega t \qquad (4)$$

$$I_2 = I_0 \cos(\omega t - (\pi/3)) \qquad (5)$$

$$I_3 = I_0 \cos(\omega t - \tfrac{2}{3}\pi) \qquad (6)$$

where $\omega$ is the angular frequency of the current and t is time.

A total magnetomotive force F in a region A where the magnetomotive forces due to the coils are added can be derived from the above equations (1) through (6) as follows:

$$F = F_1 + F_2 + F_3 = (3KI_0/2)\sin(\omega t - \theta) = (3KI_0/2)\sin(\omega t - (\pi/3P)x) \qquad (7)$$

The value $\sin(\omega t - (\pi/3P)x)$ in the equation (7) becomes maximum when $(\omega t - (\pi/3P)x) = \pi/2$, and hence the magnetomotive force F becomes maximum or $F = 3KI_0/2$ at the position of x which is found by solving the equation $(\omega t - (\pi/3P) x) = \pi/2$ for x as follows: $x = (\omega t - (\pi/2))3P/\pi = (3P/\pi)t - (3P/2)$. Since the position where the maximum magnetomotive force is produced moves with time t, the speed v of such movement can be determined by differentiating the distance x with respect to time t as follows: $v = dx/dt = 3P\omega/\pi$.

Therefore, the magnetomotive force moves at the speed of $3P\omega/\pi$, and the rotor 8 is rotated at the same speed if there is no slip.

Although magnetic fields, unlike the above moving magnetic field, are generated in regions B and B' outside of the region A, their influences are so negligible in the overall motor operation that the magnetic field can be considered to be moved at the above speed v.

Accordingly, the drive motor of the present invention can be controlled by an open-loop control process in which a desired speed is given from the relationship $v = (3P/\pi)\omega$ to determine the angular frequency $\omega$ of the currents, and the three-phase currents of the determined angular frequency are supplied to the motor, or by a feedback control process in which an encoder is attached to the motor shaft for generating pulses, and the angular frequency $\omega$ of the currents is varied or the current amplitude is changed dependent on the magnitude of the frequency of the pulses generated by the encoder.

In the foregoing embodiment, the rotor 8 is made of a nonmagnetic, electrically conductive material. Since there is no magnetic attraction between the rotor 8 and the magnetic circuit, a bearing 60 in which the shaft 6 is rotatably journalled suffers from no undue load, and there is generated no force tending to cause the shaft 6 to fall over notwithstanding the first stator 7 has the recess 80.

Figure 5:
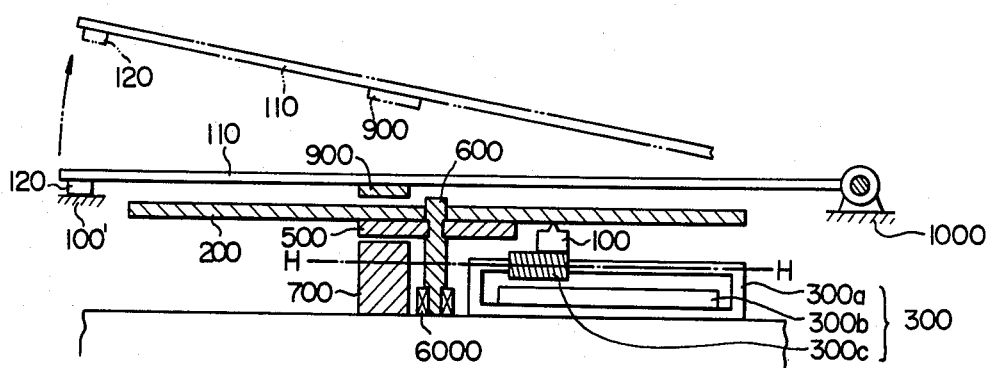
FIG. 5 is a cross-sectional view of a recording disk drive unit according to another embodiment of the present invention.

FIG. 5 shows, in cross section, a recording disk drive unit according to another embodiment of the present invention. The recording disk drive unit includes a radial feed unit 300 comprising a yoke 300a, a permanent magnet 300b, and a coil 300c. The radial feed unit 300 is positioned closely to a shaft 600 for rotating a disk 200 such as an optical information storage disk, and located within a radial space or dimension of the disk 200. Even with the radial feed unit 300 located within the radial space of the disk 200, it can provide a sufficient stroke in which a head 100 can move radially across the disk 200.

Figure 6:
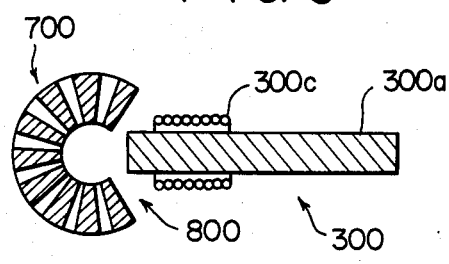
FIG. 6 is a cross-sectional view taken along line H—H of FIG. 5.

The radial feed unit 300 is positioned closely to the shaft 600 by shaping a first stator 700 of a drive motor in the form of a C with a sectorial recess 800 defined therein and placing one end of the radial feed unit 300 in the recess 800, as illustrated in FIG. 6.

The drive motor also has a rotor 500 having a portion serving as a turntable for supporting a disk thereon. The rotor 500 comprises a conductive circular plate such as of copper jointed coaxially to the shaft 600. The rotor 500 is positioned above the first stator 700 in confronting relation thereto with a gap defined therebetween.

A second stator 900 of a magnetic material is disposed upwardly of the rotor 500 in upwardly spaced relation to the upper surface of the disk 200. The second stator 900 is in the form of an arcuate plate identical in shape and size to the first stator 700 as shown in FIG. 7.

The second stator 900 is attached to the back of an openable and closable cover 110 having one end pivotally mounted on a stationary member 1000. The cover 110 has on a free end thereof an abutment 120 that can be held by gravity against another stationary member 100' when the cover 110 is closed over the disk 200. With the cover 110 thus placed over the disk 200, any desired information can be recorded on or retrieved from the disk 200 by the head 100. Under such condition, the second stator 900 is spaced upwardly from the disk 200 in vertically confronting relation to the turntable 500. For removing or replacing the disk 200, the cover 110 is opened to the imaginary position in FIG. 5, and the disk 200 is taken out, followed by insertion of a new disk 200, if necessary. The first stator 700 is of the same comb-shaped construction as that of the stator 7 shown in FIG. 3 as a straight development. The first stator 700 has coils wound in the same manner as that in which the coils of the first stator 700 are wound. The drive motor illustrated in FIG. 5 operates in the same way as that of the drive motor of FIG. 1. More specifically, when three-phase sinusoidal currents that are 60° out of phase are supplied to the terminals $T_1$, $T_2$, $T_3$ (FIG. 3), the first stator 700 produces a moving sinusoidal magnetic field The rotor 500 is now rotated by the moving magnetic field on the principles of a polyphase induction motor.

Figure 7:
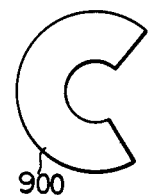
FIG. 7 is a plan view of a yoke.

According to the embodiment of FIGS. 5 through 7, the rotor 500 is made of a nonmagnetic, electrically conductive material. Since there is no magnetic attraction between the rotor 500 and the magnetic circuit, a bearing 6000 in which the shaft 600 is rotatably journalled undergoes no undue load, and there is generated no force tending to cause the shaft 600 to fall over notwithstanding the first stator 700 has the recess 800.

Since the second stator 900 is attached to the cover 110, no other means is required for supporting the second stator thereon. While the drive motor is being energized, the cover 110 is locked in the closed position under magnetic attraction between the second stator 900 and the rotor 500 to assure safe operation of the disc drive unit.

A recording disk drive unit according to still another embodiment of the present invention will be described with reference to FIG. 8. Like or corresponding parts in FIG. 8 are denoted by like or corresponding reference characters in FIGS. 5 through 7.

Figure 8:
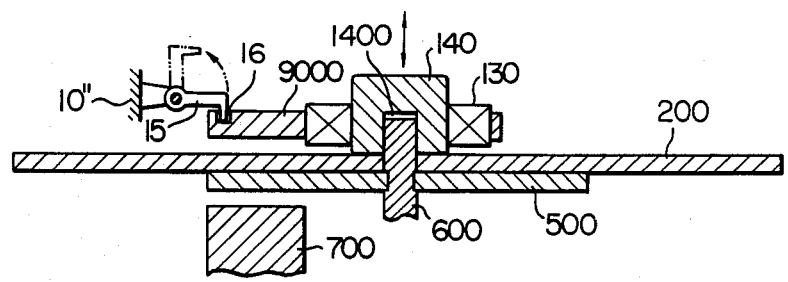
FIG. 8 is a fragmentary cross-sectional view of a recording disk drive unit according to still another embodiment of the present invention.

The recording disk drive unit shown in FIG. 8 has a second stator 9000 which is of a different construction from that of the second stators of the previous embodiments. More specifically, the second stator 9000 is rotatably mounted by a bearing 130 on a disk holder 140. The disk holder 140 has a lower central hole 1400 for insertion of the shaft 600 therein. In operation, the disk 200 is supported on the rotor 500 with the shaft 600 fitted in the hole 1400 in the disk holder 140.

A latch 15 is pivotally attached to a stationary member 10" for engagement in a cavity 16 in the second stator 9000 to stop the latter against rotation about the disk holder 140. When the second stator 9000 is thus locked by the latch 15, the second stator 9000 is maintained in confronting relation to the first stator 700. The disk 200 is held down against the rotor or turntable 500 by the disk holder 140 under magnetic attraction between the second stator 9000 and the rotor 500.

A recording disk drive unit according to a still futher embodiment will be described with reference to FIGS. 9 through 11. The recording disk drive unit has a first stator 7000 in the form of an arcuate comb-shaped block as shown in FIGS. 10 and 11. The first stator 7000 has an array of teeth on which coils C are wound in the same pattern as that shown in FIG. 3. The recording disk drive unit also includes a cup-shaped rotor 5000 of an electrically conductive material having an open end opening downwardly. A rotatable shaft 6000 extends through and is fixed to a central portion of the cup-shaped rotor 5000. The first stator 7000 is disposed outside of the cup-shaped rotor 5000 in surrounding relation thereto. A second stator 90000 is composed of a cylindrical magnetic body positioned in the rotor 5000 and secured to a fixed member. The rotatable shaft 6000 is inserted in a central hollow portion of the second stator 90000 and journalled in bearings 1300.

The first stator 7000 is disposed in confronting relation to the second stator 90000 with the rotor 5000 interposed therebetween for producing a moving magnetic field toward the rotatable sahft 6000. Thus, the first stator 7000 has a C-shaped outer profile having a radial recess, with the rotor 5000, the second stator 90000, and the rotatable shaft 6000 being accommodated in the first stator 7000 radially inwardly ofthe radial recess. The teeth of the first stator 7000 are oriented radially inwardly toward the center of curvature of the first stator 7000.

A radial feed unit 3000 is positioned in confronting relation to the first stator 7000 with the rotor 5000 interposed therebetween. The radial feed unit 3000 can be located in the vicinity of the rotor 5000.

The recording disk drive unit according to the embodiment shown in FIGS. 9 through 11 is advantageous in that the space for accommodating the first stator 7000 therein can be increased radially outwardly for achieving a higher-torque motor, so that the number of coil turns can be increased for a higher magnetomotive force generated thereby. Even if the height of the motor is limited, the size of the first stator 7000 and hence the depth of the slots therein can be radially increased to allow more coil turns to be disposed in the slots, with the result that the magnetomotive force can be raised for accomplishing a motor capable of producing a higher-torque output.

While the present invention has been shown and described as being applied to a recording disk drive unit for driving a recording disk such as an optical information storage disk, the invention is equally applicable to a recording disk drive unit for driving a magnetic disk to magnetically record information thereon or retrieve information therefrom.

Although certain preferred embodiments have been shown and described, it should be understood that many changes and modifications may be made therein without departing from the scope of the appended claims.

What is claimed is:

1. A recording disk drive unit comprising:
    (a) a turntable for placing a recording disk thereon;
    (b) a drive motor for rotating said turntable about its own axis;
    (c) a head for recording information on and retrieving information from the recording disk on said turntable;
    (d) a radial feed unit for moving said head radially across the recording disk on said turntable to allow said head to record information on and retrieve information from the recording disk while said turntable is being rotated by said motor; and
    (e) said drive motor comprising a shaft supporting said turntable, a rotor mounted coaxially on said shaft, a first C-shaped stator disposed in spaced and confronting relation to said rotor for generating a moving magnetic field, and a second stator disposed in confronting relation to said first stator with said rotor positioned therebetween;

wherein said first C-shaped stator has a radial recess, said radial feed unit having one end inserted in said recess, said stator having a plurality of teeth extending axially of said shaft.

2. A recording disk drive unit according to claim 1, wherein said first stator has a surface defined by distal ends of said teeth and disposed in confronting relation to said second stator with said rotor located therebetween.

3. A recording disk drive unit according to claim 1, wherein said first stator has a plurality of coils wound on said teeth in different phases.

4. A recording disk drive unit according to claim 3, wherein said coils include first through twelfth successive coils wound respectively on groups of every three successive teeth, said groups being shifted in phase one tooth from the adjacent groups, the sets of said first, seventh coils and said fourth, tenth coils being wound in mutually opposite directions, the sets of said third, ninth coils and said sixth, twelfth coils being wound in mutually opposite directions, the sets of said second, eighth coils and said fifth, eleventh coils being wound in mutually opposite directions, said first, fourth, seventh, tenth coils being connected to a first common terminal, said second, fifth, eighth, eleventh coils being connected to a second common terminal, said third, sixth, ninth, twelfth coils being connected to a third common terminal, the arrangement being such that said drive motor can be energized by supplying three-phase sinusoidal currents that are 60° or 120° out of phase respectively to said first through third common terminals.

5. A recording disk drive unit according to claim 4, wherein the speed of rotation of said drive motor is controlled by an open-loop control process in which a desired speed v is given from the relationship $v=(3P/\pi)\omega$ to determine the angular frequency $\omega$ of the currents, where P is the pitch of said teeth of the stator, and the three-phase sinusoidal currents of the determined angular frequency are supplied respectively to said first through third common terminals.

6. A recording disk drive unit according to claim 4, wherein the speed of rotation of said drive motor is controlled by a feedback control process in which a desired speed v is given from the relationship $v=(3P/\pi)\omega$ to determine the angular frequency $\omega$ of the currents, where P is the pitch of said teeth of the stator, and the angular frequency $\omega$ of the currents is varied or the current amplitude is changed dependent on the magnitude of the frequency of pulses generated by an encoder attached to said shaft.

7. A recording disk drive unit comprising:

(a) a turntable for placing a recording disk thereon;
(b) a drive motor for rotating said turntable about its own axis;
(c) a head for recording information on and retrieving information from the recording disk on said turntable;
(d) a radial feed unit for moving said head radially across the recording disk on said turntable to allow said head to record information on and retrieve information from the recording disk while said turntable is being rotated by said motor; and
(e) said drive motor comprising a shaft supporting said turntable, a rotor mounted coaxially on said shaft, a first C-shaped stator disposed in spaced and confronting relation to said rotor for generating a moving magnetic field, and a second stator disposed in confronting relation to said first stator with said rotor positioned therebetween;

wherein said rotor has a portion serving as said turntable, further including an openable and closable cover having one end pivotally mounted on a stationary member, said second stator being mounted on said cover and positionable in spaced and confronting relation to said rotor with the rotor being interposed between said first and second stators when said cover is closed.

8. A recording disk drive unit comprising:

(a) a turntable for placing a recording disk thereon;
(b) a drive motor for rotating said turntable about its own axis;
(c) a head for recording information on and retrieving information from the recording disk on said turntable;
(d) a radial feed unit for moving said head radially across the recording disk on said turntable to allow said head to record information on and retrieve information from the recording disk while said turntable is being rotated by said motor; and
(e) said drive motor comprising a shaft supporting said turntable, a rotor mounted coaxially on said shaft, a first C-shaped stator disposed in spaced and confronting relation to said rotor for generating a moving magnetic field, and a second stator disposed in confronting relation to said first stator with said rotor positioned therebetween;

wherein said a rotor has a portion serving as said turntable, further including a disk holder removably mounted on said shaft, said second stator being rotatably mounted on said disk holder and disposed in confronting relation to said rotor when said disk holder is mounted on said shaft, and an arm extending from a stationary member for engaging said second stator when said disk holder is mounted on said shaft.

* * * * *